United States Patent [19]
Shimomura

[11] 4,212,531
[45] Jul. 15, 1980

[54] APERTURE-CONTROLLING DEVICE IN A VARIABLE-SCALE PHOTOCOPYING MACHINE

[75] Inventor: Shozo Shimomura, Yokohama, Japan
[73] Assignee: Ricoh Co., Ltd., Tokyo, Japan
[21] Appl. No.: 48,366
[22] Filed: Jun. 14, 1979

[30] Foreign Application Priority Data

Jun. 23, 1978 [JP] Japan ............................. 53-86280[U]

[51] Int. Cl.² ...................... G03B 27/32; G03B 27/54
[52] U.S. Cl. ......................................... 355/55; 355/67
[58] Field of Search .................... 355/67 S, 57, 67, 55, 355/71

[56] References Cited
U.S. PATENT DOCUMENTS

| | | | |
|---|---|---|---|
| 3,779,642 | 12/1973 | Ogawa et al. | 355/55 |
| 3,917,393 | 11/1975 | Nier | 355/57 X |
| 4,095,884 | 6/1978 | Okamoto et al. | 355/71 X |
| 4,125,323 | 11/1978 | Ikeda et al. | 355/71 X |

*Primary Examiner*—Donald A. Griffin
*Attorney, Agent, or Firm*—Oblon, Fisher, Spivak, McClelland & Maier

[57] ABSTRACT

An aperture-controlling device in a variable-scale photocopying machine having an optical system unit which is movable to vary the scale of the photocopy relative to the original comprises an aperture-adjusting member for adjusting the width of an exposure light beam projected on a photosensitive drum, a tensioned, flexible cord connected at one end to the aperture-adjusting member, and a member following movements of the optical system unit to displace the cord at a point thereof substantially perpendicularly to its longitudinal direction thereby to actuate the aperture-adjusting member and adjust the exposure light beam width. The other end of the cord is connected to an exposure member which is adjustably movable to move the cord in forward and return movements substantially in the longitudinal direction thereof thereby to adjust the exposure light beam width independently of the adjustment thereof due to scale-varying movement of the optical system unit.

3 Claims, 5 Drawing Figures

APERTURE-CONTROLLING DEVICE IN A VARIABLE-SCALE PHOTOCOPYING MACHINE

BACKGROUND OF THE INVENTION

This invention relates generally to variable-scale photocopying machines adapted to vary the scale of the size of a photocopy relative to that of an original thereby to obtain an enlarged or reduced copy of the original. More particularly, the invention relates to an aperture-controlling device in a variable-scale photocopying machine, which device controls the quantity of photocopying exposure light projected onto a photosensitive medium in accordance with the scale of the photocopying.

In a variable-scale photocopying machine of the character referred to above, the rotational speed of the drum bearing the photosensitive medium at the time of enlargement and that at the time of reduction are the same, but at the time of reduction, the scanning speed increases to a value which is the product of the scanning speed for normal or equal-scale photocopying and the reciprocal of the reduction rate or fraction. For this reason, the quantity of light to which the photosensitive drum is exposed per unit time decreases. Furthermore, since the projected picture is reduced in size by changing the lens or otherwise changing the lens focus at the time of reduction, the luminance or level of illumination on the photosensitive medium on the drum differs from that at the time of enlargement.

SUMMARY OF THE INVENTION

In view of the above described points of difference, it is an object of this invention to provide an aperture-controlling device in a variable-scale photocopying machine capable of controlling the quantity of light projected on the photosensitive medium appropriately in accordance with the scale of photocopying.

According to this invention in one aspect thereof, briefly summarized, there is provided an aperture-controlling device in a variable-scale photocopying machine having an optical system including an optical system unit which is movable to vary the scale of the photocopy relative to the original picture, a photosensitive drum, and a light source for supplying light through the optical system to be projected as an exposure light beam onto the photosensitive drum, the aperture-controlling device comprising an aperture-adjusting mechanism for adjusting the width of the exposure light beam, a tensioned, flexible cord-like structure connected at one end thereof to the aperture-adjusting mechanism for actuation thereof, and a member actuated by a movement of the optical system unit to displace the cord-like structure at a point thereof substantially transversely to the longitudinal direction thereof thereby to actuate the aperture-adjusting mechanism and adjust the width of the exposure light beam in response to the movement of the optical system unit.

According to this invention in another aspect thereof, briefly summarized, there is provided an exposure-controlling device as summarized above in which the other end of the cord-like structure is connected to an exposure-adjusting member, which is movable in adjusting movements to move the cord-like structure in forward and return movements substantially in the longitudinal direction thereof thereby to adjust the exposure light beam width independently of the adjustment thereof due to movement of the optical system unit.

The nature, utility, and further features of this invention will be more clearly apparent from the following detailed description with respect to a preferred embodiment of the invention when read in conjunction with the accompanying drawings.

DETAILED DESCRIPTION OF THE INVENTION

Figure 1:
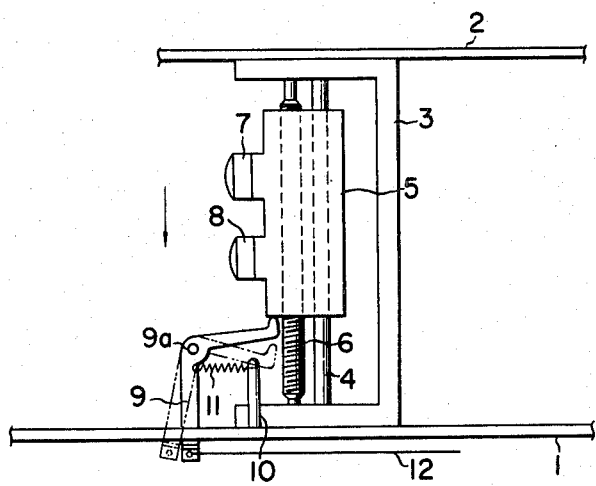
FIG. 1 is a plan view showing one example of an aperture-controlling device according to this invention of a variable-scale photocopying machine.
Figure 2:
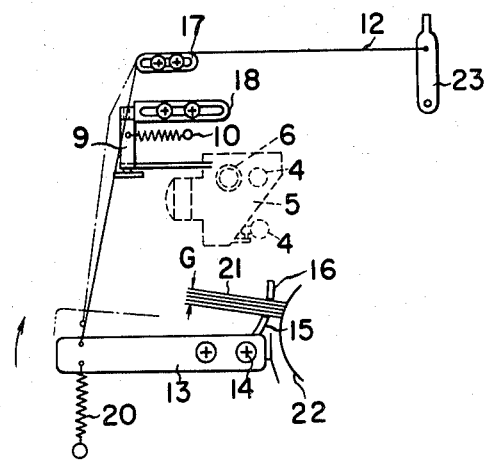
FIG. 2 is a side elevation, with parts deleted, schematically showing the essential parts of the device shown in FIG. 1.

As shown in FIGS. 1 and 2, a lens housing 3 is interposed between and secured to a front side plate 1 and a rear side plate 2 of a photocopying machine. This lens housing 3 is provided therewithin with a pair of parallel guide rods 4,4 extending across the lens housing 3 from the front side to the rear side thereof. An optical system unit 5 is slidably mounted on the guide rods 4, 4 to slide therealong in guided transitional movement. This optical system unit 5 is driven in this transitional movement in either direction by a motor (not shown) whose rotation is transmitted to and rotates a screw shaft 6 extending parallelly to the guide rods 4,4 and meshed with female screw threads formed in the optical system unit 5.

The optical system unit 5 is provided with a scale-varying lens 7 and an equal-scale lens 8 spaced apart from the scale-varying lens 7 in a direction parallel to the guide rods 4,4. Depending on whether the photocopying is set to be with varied scale or whether it is set to be with equal scale, the optical system unit 5 is moved as described above to bring the pertinent lens (7 or 8) into register with the optical path of the light which is to scan the original to be photocopied.

In the vicinity of the optical system unit 5, a regulating lever 9 of bell-crank type is pivotally supported at its bend portion by a pivot pin 9a. A tension spring 11 is stretched between one arm of the lever 9 and an anchor bolt 10 imbeddedly fixed at its root end to the front side plate 1 and thus urges the level 9 to rotate in the counterclockwise direction, as viewed in FIG. 1, whereby the outer end of the other arm of the lever 9 is pressed against the front end surface of the optical system unit 5 thereby to follow all movements thereof. Thus, any movement or displacement of the optical system unit in the above described manner results in a corresponding rotational displacement of the regulating lever 9.

A flexible aperture string or cord 12 is passed through the outer end of the above mentioned arm of the lever 9 to which the spring 11 is attached. One end of this aperture cord 12 is secured to the distal outer end of a movable aperture lever 13, while the other end of the cord 12 is secured to an exposure adjusting lever 23.

The movable aperture lever 13 is in the form of a lever pivotally supported at its proximal inner end by a pivot shaft 14 as shown in FIG. 2. A tension spring 20 secured at one end to the distal end of the aperture lever 13 urges this aperture lever to rotate in the direction (counter-clockwise as viewed in FIG. 2) away from the aperture cord 12, which is thereby tensioned. The aperture lever 13 is provided at its proximal end with a movable aperture member 15 fixed thereto and projecting toward an exposure light beam 21. This light beam 21 is passed through an aperture G between the movable aperture member 15 and a stationary aperture member 16 and is thus projected onto a photosensitive drum 22. The aperture cord 12 is in sliding contact also with adjusting guides 17 and 18, which can be slidably adjusted to vary the tension of the aperture cord 12 thereby to adjust the angular position of the aperture lever 13 and, therefore, the width of the aperture G.

The operation of the aperture controlling device of the above described construction according to this invention will now be described with respect to the case where the aperture width G is enlarged at the time of photocopying with reduced scale.

When a scale-changing button (not shown) is moved in the "ON" direction, the optical system unit 5 moves in the arrow direction in FIG. 1. The regulating lever 9 is thereby turned clockwise, and the aperture cord 12 passed through the outer end of one arm of this lever 9 is additionally tensioned by being displaced toward the left as viewed in FIGS. 1 and 2. Consequently, the aperture lever 13 is turned clockwise in the arrow direction shown in FIG. 2, and the aperture gap G determining the width of the light beam 21 between the movable and stationary aperture members 15 and 16 is widened. Thus, a suitably corrected state of light exposure is attained.

Furthermore, since the lens aperture is constricted during reduction photocopying, it is necessary to make the aperture-adjustment width smaller than that for equal-scale photocopying. This can be accomplished by moving the exposure-adjusting lever 23, whereupon the aperture cord 12 is moved substantially in its longitudinal direction, whereby the aperture lever 13 is turned independently of the adjustment action due to movement of the optical system unit 5. Thus, the exposure of the photocopy can be varied in a range between dark (D) and light (L) as necessary. The principle of these adjustments will now be described with reference to FIGS. 3, 4A, and 4B.

Figure 3:
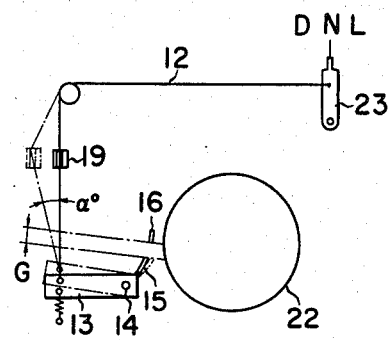
FIG. 3 is a schematic side view of the aperture-controlling device of the invention for a description of the state of adjustment of the exposure light beam width.

FIG. 3 indicates that when an aperture cord guide 19 is shifted with the exposure-adjusting lever 23 in its normal state N, the aperture width G differs for equal-scale photocopying (solid line) and reduction photocopying (single-dot chain line), and the appropriate exposure light quantity is obtained.

Figure 4A:
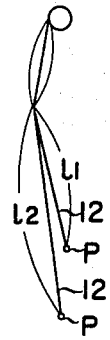
FIGS. 4A and 4B are schematic diagrams indicating the principle of adjustments of the exposure light beam width.

The case where the exposure-adjusting lever 23 is turned from its normal state N to its "dark" state D will now be described with reference to FIGS. 4A and 4B.

Figure 4B:
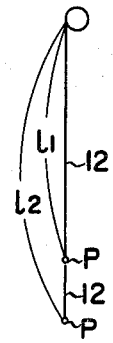

When the lever 23 is thus turned from its normal state N to its dark state D, the connection point P between the aperture cord 12 and the aperture lever 13 shifts as indicated in FIGS. 4B by a distance substantially corresponding to $l_2-l_1$. At the time of reduction photocopying, the shifting distance of the aperture cord 12 would appear to correspond to $l_2-l_1$ as indicated in FIG. 4A, but because of the angle $\alpha$ as shown in FIG. 3, the actual shifting distance substantially corresponds to a smaller distance. Accordingly, the angle through which the aperture lever 13 rotates when, at the time of reduction, the lever 23 is turned from its normal state N to its dark state D becomes smaller than that at the time of equal-scale photocopying. On the basis of the above described principle, it is possible to carry out equal-scale, enlargement, and reduction photocopying with respectively appropriate light quantities.

In the aperture-controlling device according to this invention in a variable-scale photocopying machine, as described above, the optical system unit and the aperture lever for regulating the width of the exposure light beam projected onto the photosensitive drum are connected by a string-like structure, whereby the aperture lever is caused to rotate interrelatedly with the shifting of the optical system unit. Therefore, the photosensitive medium can be exposed to an exposure light of optimum width for obtaining an excellent photocopy. Furthermore, accurate and positive aperture adjustment can be achieved as necessary also by means of the exposure lever.

What I claim is:

1. In a variable-scale photocopying machine having an optical system including an optical system unit which is movable for selectively positioning on the optical axis of the optical system, in accordance with a designated photocopying scale, a corresponding lens, a photosensitive drum, and a light source for supplying light through the optical system to be projected as an exposure light beam onto the photosensitive drum, the combination therewith of an aperture-controlling device comprising an aperture-adjusting mechanism for adjusting the width of the exposure light beam, a flexible cord-like structure in tensioned state connected at one end thereof to the aperture-adjusting mechanism for actuation thereof, and a member actuated by a movement of the optical system unit to displace the cord-like structure at a point thereof substantially transversely to the longitudinal direction thereof thereby to actuate the aperture-adjusting mechanism and adjust the width of the exposure light beam in response to the movement of the optical system unit.

2. The aperture-controlling device as claimed in claim 1 in which the aperture-adjusting mechanism comprises a stationary aperture member, a movable aperture member, said aperture members forming therebetween an adjustable aperture which determines the width of the exposure light beam and is adjustable by movement of the movable aperture member, and an aperture lever having an arm to whose outer end the one end of the cord-like structure is connected, the movable aperture being connected to the aperture lever and being moved thereby to adjust the exposure light beam width.

3. The aperture-controlling device as claimed in claim 1 or 2 in which the other end of the cord-like structure is connected to an exposure-adjusting member which is movable in adjusting movements to move the cord-like structure in forward and return movements substantially in the longitudinal direction thereof thereby to adjust the exposure light beam width independently of the adjustment thereof due to movement of the optical system unit.

* * * * *